US008798885B2

(12) United States Patent
Tsuchida

(10) Patent No.: US 8,798,885 B2
(45) Date of Patent: Aug. 5, 2014

(54) COLLISION REDUCING DEVICE

(75) Inventor: Jun Tsuchida, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 580 days.

(21) Appl. No.: 12/532,496

(22) PCT Filed: Jun. 12, 2008

(86) PCT No.: PCT/JP2008/061180
§ 371 (c)(1),
(2), (4) Date: Sep. 22, 2009

(87) PCT Pub. No.: WO2008/153205
PCT Pub. Date: Dec. 18, 2008

(65) Prior Publication Data
US 2010/0106387 A1 Apr. 29, 2010

(30) Foreign Application Priority Data
Jun. 14, 2007 (JP) ................................ 2007-157658

(51) Int. Cl.
*G06F 19/00* (2011.01)
*B60R 21/0134* (2006.01)
*G08G 1/16* (2006.01)
*B60T 7/22* (2006.01)
*B60R 21/01* (2006.01)

(52) U.S. Cl.
CPC ............ *B60R 21/0134* (2013.01); *G08G 1/163* (2013.01); *G08G 1/16* (2013.01); *B60T 7/22* (2013.01); *B60R 2021/01259* (2013.01); *B60R 2021/01265* (2013.01); *B60W 2420/52* (2013.01); *B60W 2520/10* (2013.01); *B60W 2520/14* (2013.01); *B60W 2420/403* (2013.01)
USPC ............................... 701/70; 701/45; 701/301

(58) Field of Classification Search
CPC ......... G08G 1/16; G08G 1/161; G08G 1/162; G08G 1/163; G08G 1/164; G08G 1/165; G08G 1/166; G08G 1/167; G08G 1/168; B60R 21/00; B60R 21/01; B60R 21/013; B60R 21/0132; B60R 21/0134; B60R 2021/01259; B60T 7/12; B60T 7/22; B60W 2420/40; B60W 2420/403; B60W 2420/406; B60W 2420/42; B60W 2420/50; B60W 2420/503; B60W 2420/506; B60W 2420/52; B60W 2420/54; B60W 2420/60; B60W 2420/62; B60W 2520/10; B60W 2520/105; B60W 2520/14; B60W 2520/16; B60W 2520/18; B60W 2540/18
USPC ......................................... 701/300, 301, 302
See application file for complete search history.

(56) References Cited

U.S. PATENT DOCUMENTS 7,124,027 B1 * 10/2006 Ernst et al. .................... 701/301
2007/0198136 A1 * 8/2007 Kobayashi et al. ............... 701/1

FOREIGN PATENT DOCUMENTS

| CN | 1134896 A | 11/1996 |
|---|---|---|
| EP | 1785317 A1 | 5/2007 |
| JP | A-6-150199 | 5/1994 |
| JP | A-2001-171497 | 6/2001 |
| JP | A-2003-175794 | 6/2003 |
| JP | A-2005-82124 | 3/2005 |
| JP | A-2005-100232 | 4/2005 |
| JP | A-2006-99715 | 4/2006 |
| JP | 2007115075 A * | 5/2007 |
| JP | A-2007-115075 | 5/2007 |
| WO | WO 2004/058546 A1 | 7/2004 |

OTHER PUBLICATIONS

International Preliminary Report on Patentability mailed on Dec. 30, 2009 in corresponding International Application No. PCT/JP2008/061180.
Search Report issued in European Patent Appln. No. 08777356.0; mailed Dec. 28, 2011.
Chinese Office Action issued in Chinese Patent Application No. 200880019483.2; mailed Aug. 24, 2011; with English language translation.

* cited by examiner

Primary Examiner — Jerrah Edwards
(74) Attorney, Agent, or Firm — Oliff PLC

(57) ABSTRACT

A collision reducing device including a radar, an image sensor, a collision mitigation, and a brake. A collision predicting section of the collision mitigation has a first actuating section for causing a vehicle control section to perform running control when a collision possibility exceeds a reference value in one-frame determination, a second actuating section for causing the vehicle control section to perform running control when the collision possibility exceeds a reference value in M-frame determination, and a selecting section for selectively operating the first actuating section and second actuating section, so that the vehicle control section can be operated by two kinds of numbers of determinations, whereby the speed of collision determination can be secured by a smaller number of determinations when operating the first actuating section, while malfunctions can be reduced more by a greater number of determinations when operating the second actuating section.

9 Claims, 12 Drawing Sheets

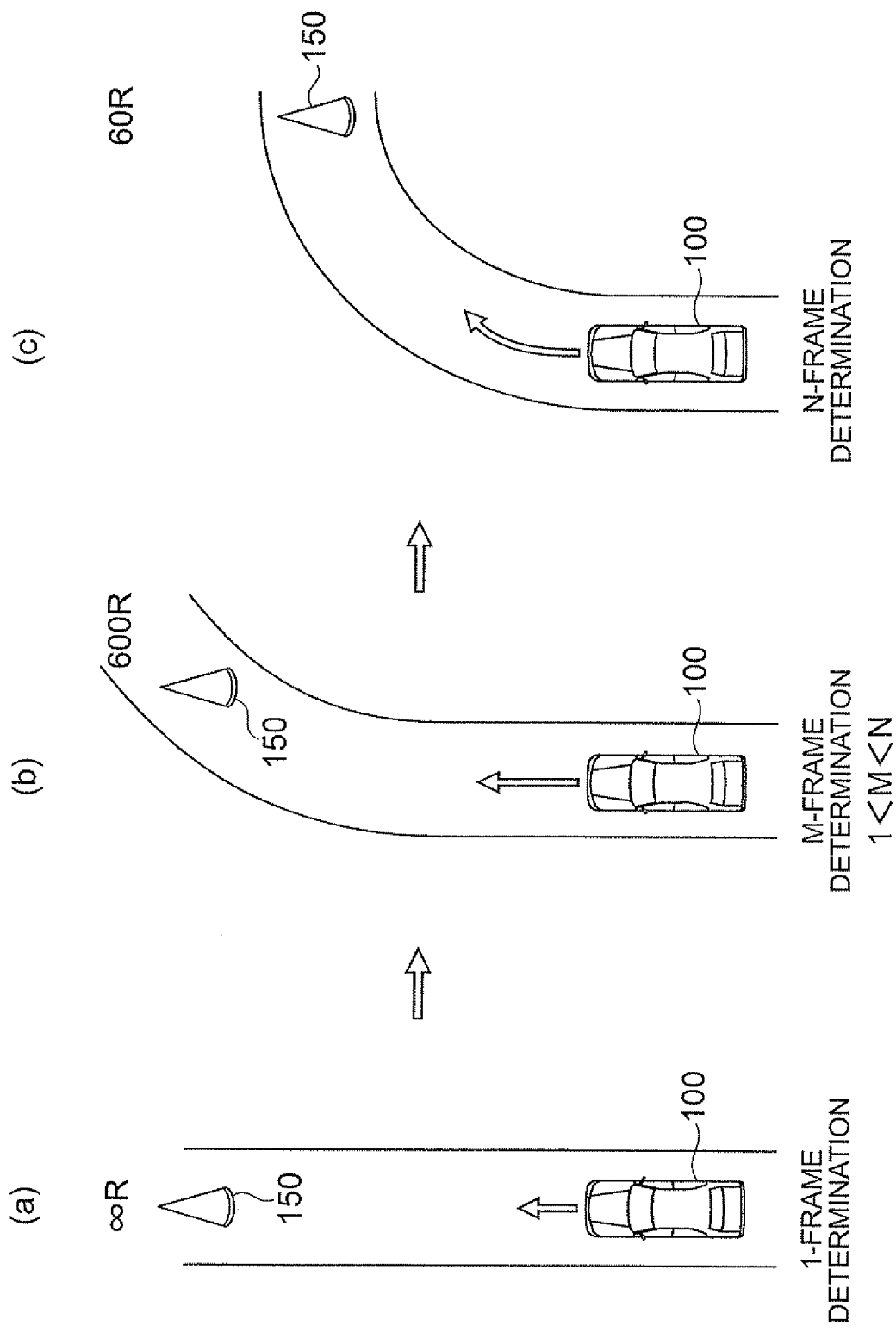

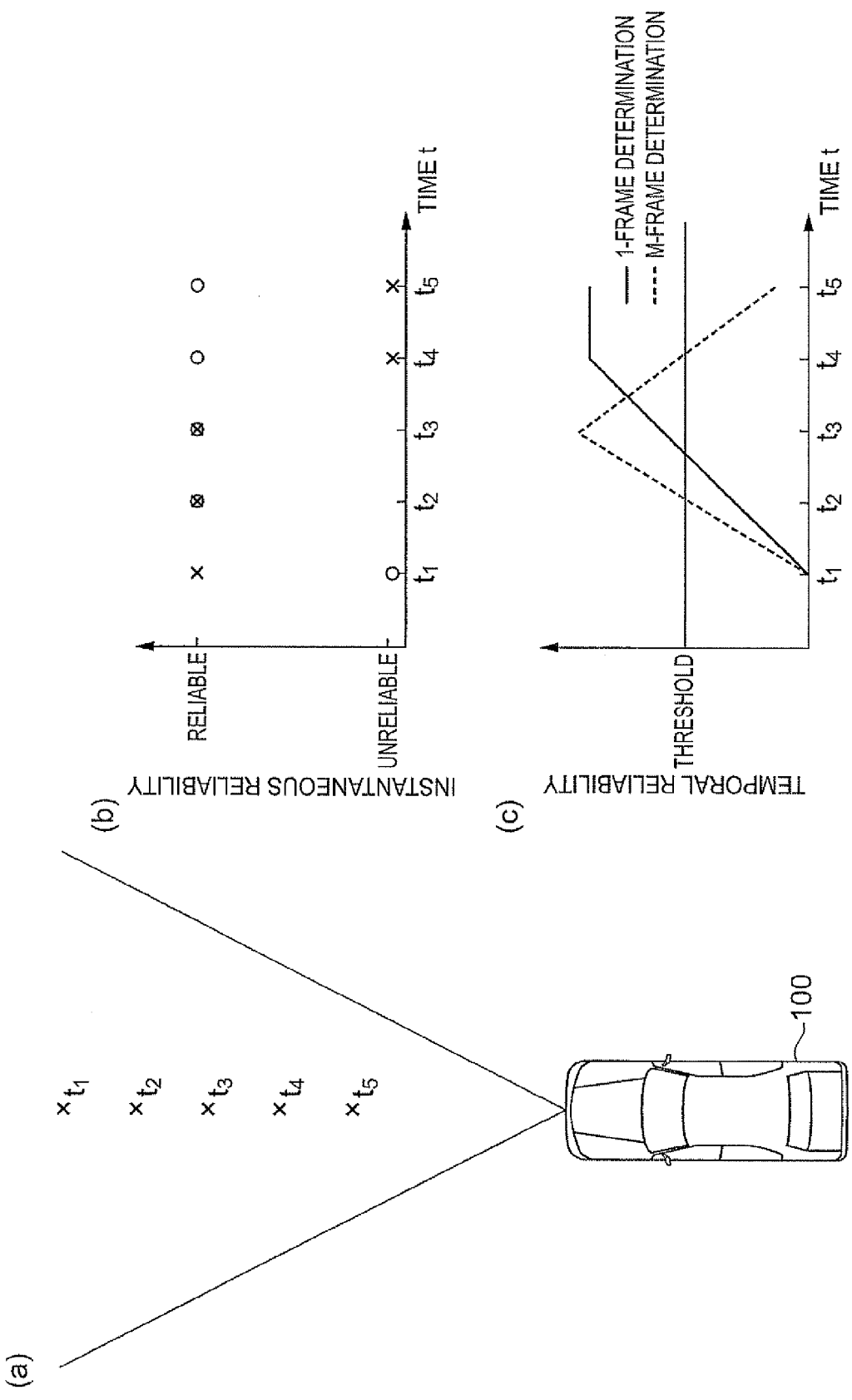

COLLISION REDUCING DEVICE

TECHNICAL FIELD

The present invention relates to a collision reducing device and, in particular, to a collision reducing device which carries out control for reducing influences of collisions by determining a collision possibility between an own vehicle and an object existing about the own vehicle at each discrete time.

1. Background Art

Driving assistance apparatus such as collision reducing device, adaptive cruise control apparatus, and follow-up running apparatus have recently been developed. For example, Japanese Patent Application Laid-Open No. 2005-100232 discloses a technique for determining a possibility of colliding with an obstacle existing in a moving direction of a vehicle, so as to accurately determine the possibility of colliding with the obstacle, thereby effectively actuating a collision reducing device.

2. Disclosure of Invention

However, the above-mentioned technique determines the possibility of colliding with the obstacle independently for each instant and thus may incur a fear of malfunctioning such as to carry out a collision mitigation control operation when there is no possibility of collision in practice if the collision reducing device is actuated by once determining that there is a possibility of collision. When the collision reducing device is actuated by a plurality of determinations indicating a collision possibility with reference to determinations in the past, on the other hand, there is a fear of taking time for determinations, thereby retarding the actuation of the collision reducing device.

In view of such circumstances, it is an object of the present invention to provide a collision reducing device which reduces malfunctions more while securing the speed of collision determination.

The present invention is a collision reducing device comprising object detecting means for detecting an object existing about an own vehicle; collision possibility determining means for determining a collision possibility between the object detected by the object detecting means and the own vehicle at each discrete time; and collision influence reducing means for reducing an influence of a collision according to the collision possibility determined by the collision possibility determining means; wherein the collision possibility determining means has first actuating means for causing the collision influence reducing means to perform control when the collision possibility exceeds a first reference value a first number of times or more, second actuating means for causing the collision influence reducing means to perform control when the collision possibility exceeds the first reference value a second number of times or more, the second number being greater than the first number, and selecting means for selectively operating the first and second actuating means.

In this structure, since the collision possibility determining means has the first actuating means for causing the collision influence reducing means to perform control when the collision possibility exceeds a first reference value at least a first number of times which is a smaller number, the second actuating means for causing the collision influence reducing means to perform control when the collision possibility exceeds the first reference value at least a second number of times which is greater than the first number of times, and the selecting means for selectively operating the first and second actuating means, the collision influence reducing means can be operated by two kinds of numbers of determinations, whereby the speed of collision determination can be secured by a smaller number of determinations when operating the first actuating means, while malfunctions can be reduced more by a greater number of determinations when operating the second actuating means.

In this case, the selecting means operates the first actuating means when the collision possibility exceeds the second reference value and operates the second actuating means when the collision possibility does not exceed the second reference value.

This structure allows the selecting means to speed up the collision determination by operating the first actuating means when the collision possibility exceeds the second reference value and yields a high risk, and reduce malfunctions more by operating the second actuating means when the collision possibility fails to exceed the second reference value and yields a low risk.

The apparatus may further comprise vehicle speed detecting means for detecting an own vehicle speed, while the selecting means operates the first actuating means when the own vehicle speed detected by the vehicle speed detecting means exceeds a third reference value and operates the second actuating means when the own vehicle speed detected by the vehicle speed detecting means does not exceed a third reference value.

This structure allows the selecting means to speed up the collision determination by operating the first actuating means when the own vehicle speed detected by the vehicle speed detecting means exceeds the third reference value and yields a high risk, and reduce malfunctions more by operating the second actuating means when the own vehicle speed detected by the vehicle speed detecting means fails to exceed the third reference value and yields a low risk.

The apparatus may further comprise braking means for performing a braking operation of the own vehicle, while the selecting means operates the first actuating means when the braking means does not perform the braking operation and operates the second actuating means when the braking means performs the braking operation.

This structure allows the selecting means to speed up the collision determination by operating the first actuating means at a risky time when the braking means does not perform the braking operation, and reduce malfunctions more by operating the second actuating means at a relatively safe time when the braking means performs the braking operation.

The selecting means may operate the first actuating means when a curvature of a running path of the own vehicle exceeds a fourth reference value and may operate the second actuating means when a curvature of a running path of the own vehicle does not exceed a fourth reference value.

This structure allows the selecting means to speed up the collision determination by operating the first actuating means when the running path of the own vehicle is a gentle curve or straight path with a curvature exceeding the fourth reference value, since the vehicle speed is typically so high that the driver is not supposed to pay attention, and reduce malfunctions more by operating the second actuating means when the running path of the own vehicle is a sharp curve with a curvature not exceeding the fourth reference value, since the vehicle speed is typically so low that the driver is supposed to pay attention.

The selecting means may operate the first actuating means when a detection accuracy of the object detecting means exceeds a fifth reference value and may operate the second actuating means when a detection accuracy of the object detecting means does not exceed a fifth reference value.

This structure allows the selecting means to speed up the collision determination by operating the first actuating means when the detection accuracy of the object detecting means exceeds the fifth reference value so that the risk is reliably supposed to be high, and reduce malfunctions more by operating the second actuating means when the detection accuracy of the object detecting means fails to exceed the fifth reference value so that whether it is risky or not is unclear.

The apparatus may further comprise a driver monitor sensor for detecting an alertness of a driver, while the selecting means operates the first actuating means when the alertness of the driver detected by the driver monitor sensor is less than a sixth reference value and operates the second actuating means when the alertness of the driver detected by the driver monitor sensor is not less than a sixth reference value.

This structure allows the selecting means to speed up the collision determination by operating the first actuating means when the alertness of the driver detected by the driver monitor sensor is less than the sixth reference value and yields a high risk, and reduce malfunctions more by operating the second actuating means when the alertness of the driver detected by the driver monitor sensor is the sixth reference value or greater so that attention is paid.

The collision reducing device of the present invention can operate the collision influence reducing means by two kinds of determination numbers, so as to secure the speed of collision determination by a smaller determination number when operating the first actuating means, and reduce malfunctions more by a greater determination number when operating the second actuating means.

BRIEF DESCRIPTION OF DRAWINGS

FIGS. 11(a) to (c) are diagrams illustrating how the validity of one-frame determination is judged according to curvature of curves; and FIGS. 12(a) to (c) are diagrams illustrating how the validity of one-frame determination is judged according to the reliability of the detection value per frame.

DESCRIPTION OF EMBODIMENTS

In the following, the collision reducing device in accordance with an embodiment of the present invention will be explained with reference to the accompanying drawings.

Figure 1:
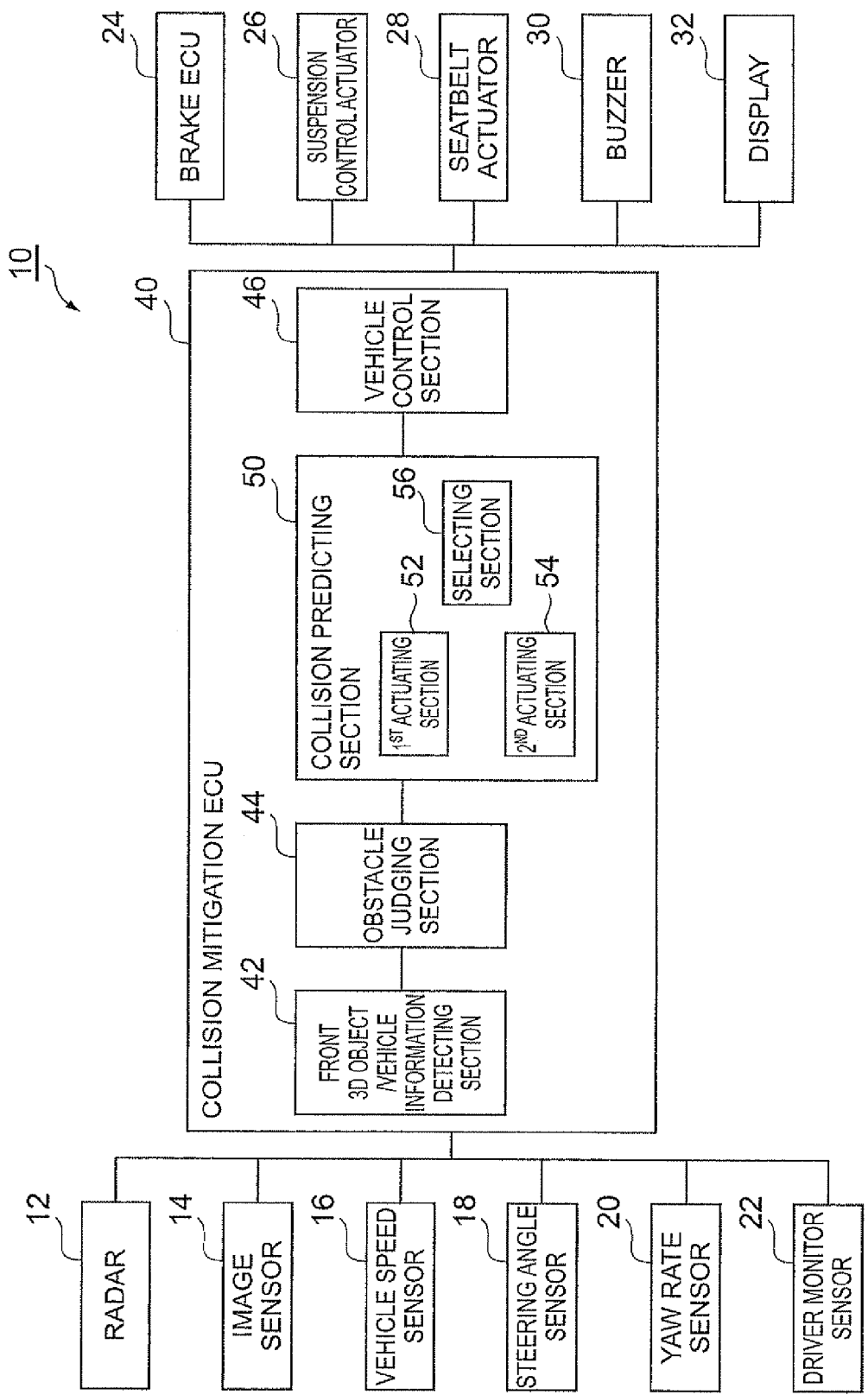
FIG. 1 is a block diagram illustrating the structure of the collision reducing device in accordance with an embodiment.

The collision reducing device in accordance with this embodiment is one for detecting automobiles, pedestrians, and the like about a vehicle and carrying out various kinds of control for preventing and mitigating collisions with thus detected objects. FIG. 1 is a block diagram illustrating the structure of the collision reducing device in accordance with this embodiment.

As illustrated in FIG. 1, the collision reducing device 10 in accordance with this embodiment is mainly constituted by a collision mitigation ECU 40, while various sensors of a radar 12, an image sensor 14, a vehicle speed sensor 16, a steering angle sensor 18, a yaw rate sensor 20, and a driver monitor sensor 22 are connected to the collision mitigation ECU 40. Further, a brake ECU 24, a suspension control actuator 26, a seatbelt actuator 28, a buzzer 30, and a display 33 are connected to the collision mitigation ECU 40 and perform various kinds of control according to control signals from the collision mitigation ECU 40, in order to prevent and mitigate collisions with the objects.

Individual parts of the collision reducing device 10 in accordance with this embodiment will now be explained in further details. A millimeter-wave radar or laser radar may be employed as the radar 12. A stereo camera or monocular camera may be employed as the image sensor 14. The radar 12 and image sensor 14 function as the object detecting means recited in the claims.

The vehicle speed sensor 16 is a sensor for detecting the vehicle speed of the own vehicle and functions as the vehicle speed detecting means recited in the claims. The steering angle sensor 18 is a sensor for detecting the steering angle of the own vehicle, while the yaw rate sensor 20 is a sensor for detecting the yaw rate (rotational angular velocity) of the own vehicle.

The driver monitor sensor 22 is one for detecting the alertness of a driver. Specifically, the driver monitor sensor 22 detects the face orientation of the driver and determines whether or not the face of the driver is directed to the objects detected by the radar 12 and image sensor 14, thereby estimating the alertness of the driver. Alternatively, the driver monitor sensor 22 may detect the degree of tension of the driver or whether the driver dozes off or not according to pulses, brain waves, and the like of the driver.

The collision mitigation ECU 40 has a front three-dimensional object/vehicle information detecting section 42, an obstacle judging section 44, a vehicle control section 46, and a collision predicting section 50.

The front three-dimensional object/vehicle information detecting section 42 is one for acquiring information concerning three-dimensional objects/other vehicles existing in front of the own vehicle from results of detection by the radar 12 and image sensor 14. The obstacle judging section 44 is one for judging whether or not the objects and other vehicles detected by the front three-dimensional object/vehicle information detecting section 42 are those which may obstruct the running of the vehicle instead of mere buildings and the like.

The collision predicting section 50 is one for determining the collision possibility between an obstacle judged by the obstacle judging section 44 and the own vehicle for each of frames at intervals of 10 to 500 ms, for example, and functions as the collision possibility determining means recited in the claims. The collision predicting section 50 includes a first actuating section (first actuating means) 52, a second actuating section (second actuating means) 54, and a selecting section (selecting means) 56. When the collision possibility exceeds a predetermined probability (first reference value) in N frames N times, e.g., one frame, the first actuating section 52 causes the vehicle control section 46 to perform various kinds of control for preventing and mitigating collisions. When the collision possibility exceeds the predetermined probability (first reference value) in M frames M times where M is greater than N, on the other hand, the second actuating section 54 causes the vehicle control section 46 to perform various kinds of control for preventing and mitigating collisions. The selecting section 56 selects which of the first and second actuating sections 52, 54 to actuate according to a determination criterion which will be explained later.

The vehicle control section 46 is one for controlling the brake ECU 24, suspension control actuator 26, seatbelt actuator 28, buzzer 30, and display 32 according to the collision possibility with the own vehicle predicted by the collision predicting section 50.

The brake ECU 24, suspension control actuator 26, seatbelt actuator 28, buzzer 30, and display 32 perform operations for preventing and mitigating collisions with objects according to control signals from the vehicle control section 46 of the collision predicting section 50. The brake ECU 24 imparts a predetermined braking force to the own vehicle when the collision possibility is high. When the brake ECU 24 imparts the braking force to the own vehicle, the suspension control actuator 26 controls suspensions such that the front part of the own vehicle is not sunk by the braking force. When the collision possibility is high, the seatbelt actuator 28 draws in a seatbelt by a predetermined amount. When the collision possibility is high, the buzzer 30 and display 32 issue a predetermined alarm to the driver. The brake ECU functions as the braking means recited in the claims.

Figure 2:
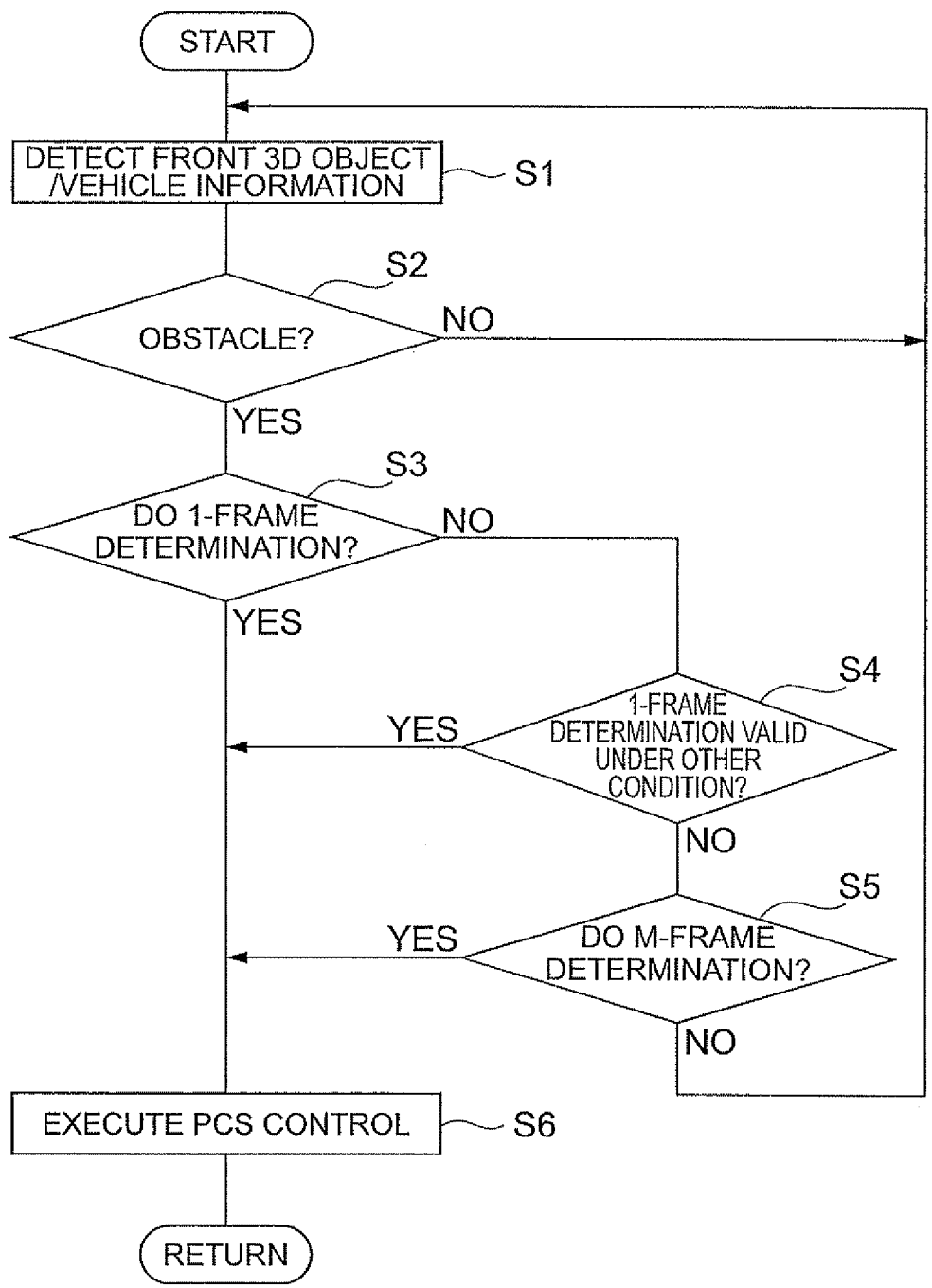
FIG. 2 is a flowchart illustrating a processing procedure of collision mitigation control by the collision reducing device in accordance with the embodiment.

Operations of the collision reducing device 10 will now be explained with reference to FIG. 2. FIG. 2 is a flowchart illustrating a processing procedure of collision mitigation control by the collision reducing device in accordance with this embodiment. This control is repeatedly executed at predetermined timings after the power supply of the vehicle is turned on until it is turned off.

At step S1, the front three-dimensional object/vehicle information detecting section 42 acquires information concerning three-dimensional objects and other vehicles existing in front of the own vehicle from results of detection by the radar 12 and image sensor 14. At step S2, the obstacle judging section 44 judges whether or not the three-dimensional objects and other vehicles detected by the front three-dimensional object/vehicle information detecting section 42 are those which may obstruct the running of the vehicle instead of mere buildings and the like.

At step S3, the selecting section 56 of the collision predicting section 50 determines whether or not to operate the first actuating section 52, so as to actuate the vehicle control section 46 according to one-frame determination. When the collision possibility between an obstacle judged by the obstacle judging section 44 and the own vehicle exceeds a predetermined value (second reference value) in this case, it will be preferred if the determination time is shorter, whereby the selecting section 56 operates the first actuating section 52, so as to actuate the vehicle control section 46 according to the one-frame determination, thereby performing PCS (Pre-Crash Safety) control (S6). The collision possibility at step S3 is determined by an instantaneous value of TTC (time to collision distance to the object/speed relative to the object).

At step S4, as will be explained later in detail, it is judged whether or not the one-frame determination is valid under a condition other than the collision possibility between the obstacle and own vehicle when the collision possibility does not exceed a predetermined value (second reference value) at step S3. When the one-frame determination is judged valid in this case, the selecting section 56 operates the first actuating section 52, so as to actuate the vehicle control section 46 according to the one-frame determination, thereby performing the PCS control (S6).

When it is judged at step S4 that the one-frame determination is invalid under a condition other than the collision possibility, it is judged at step S5 whether or not to operate the vehicle control section 46 by M-frame determination. When the M-frame determination is judged valid in this case, the selecting section 56 operates the second actuating section 54, so as to actuate the vehicle control section 46 according to the M-frame determination, thereby performing the PCS control (S6). When the M-frame determination is also judged invalid, on the other hand, the flow returns to step S1.

Figure 3:
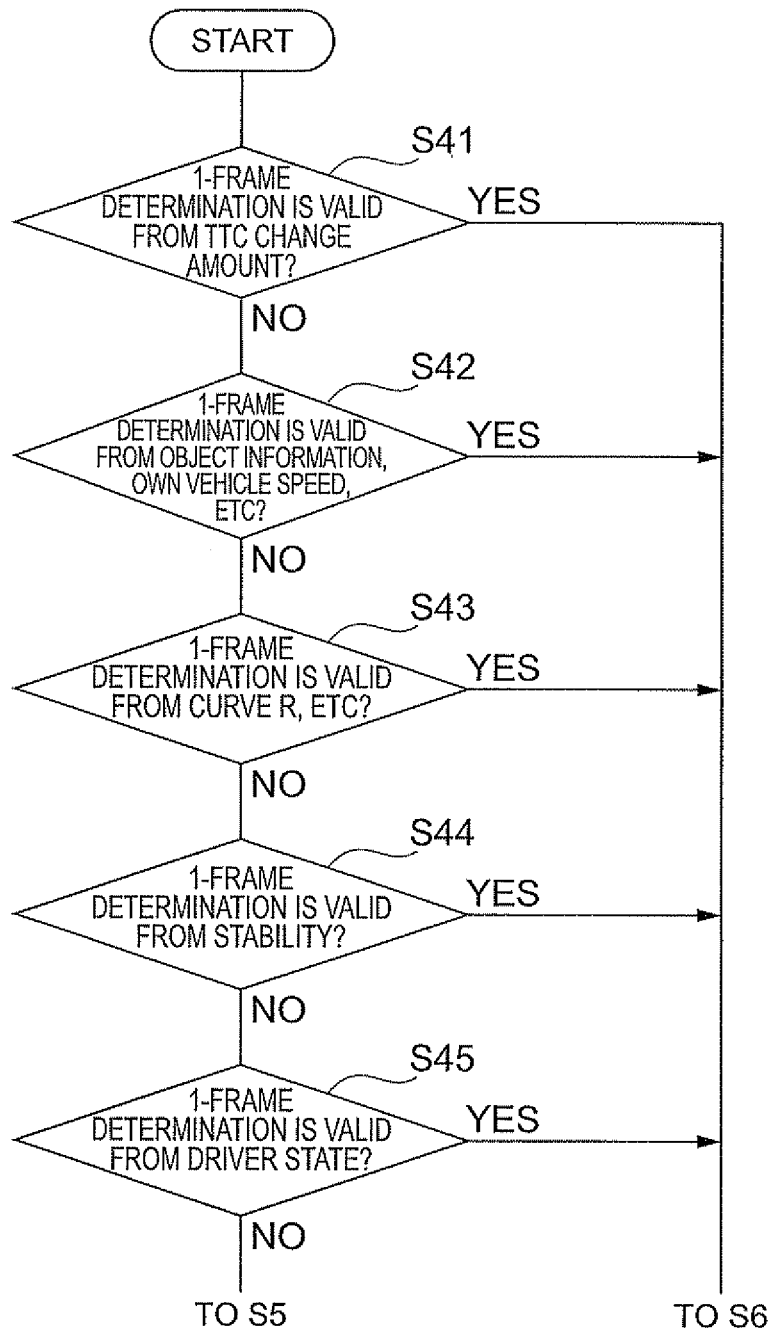
FIG. 3 is a flowchart illustrating a processing procedure for judging the validity of one-frame determination in the collision mitigation control.

A method of judging the validity of one-frame determination under a condition other than the collision possibility at the above-mentioned step S4 will now be explained in detail. FIG. 3 is a flowchart illustrating a processing procedure for judging the validity of one frame determination for collision mitigation control.

Figure 4:
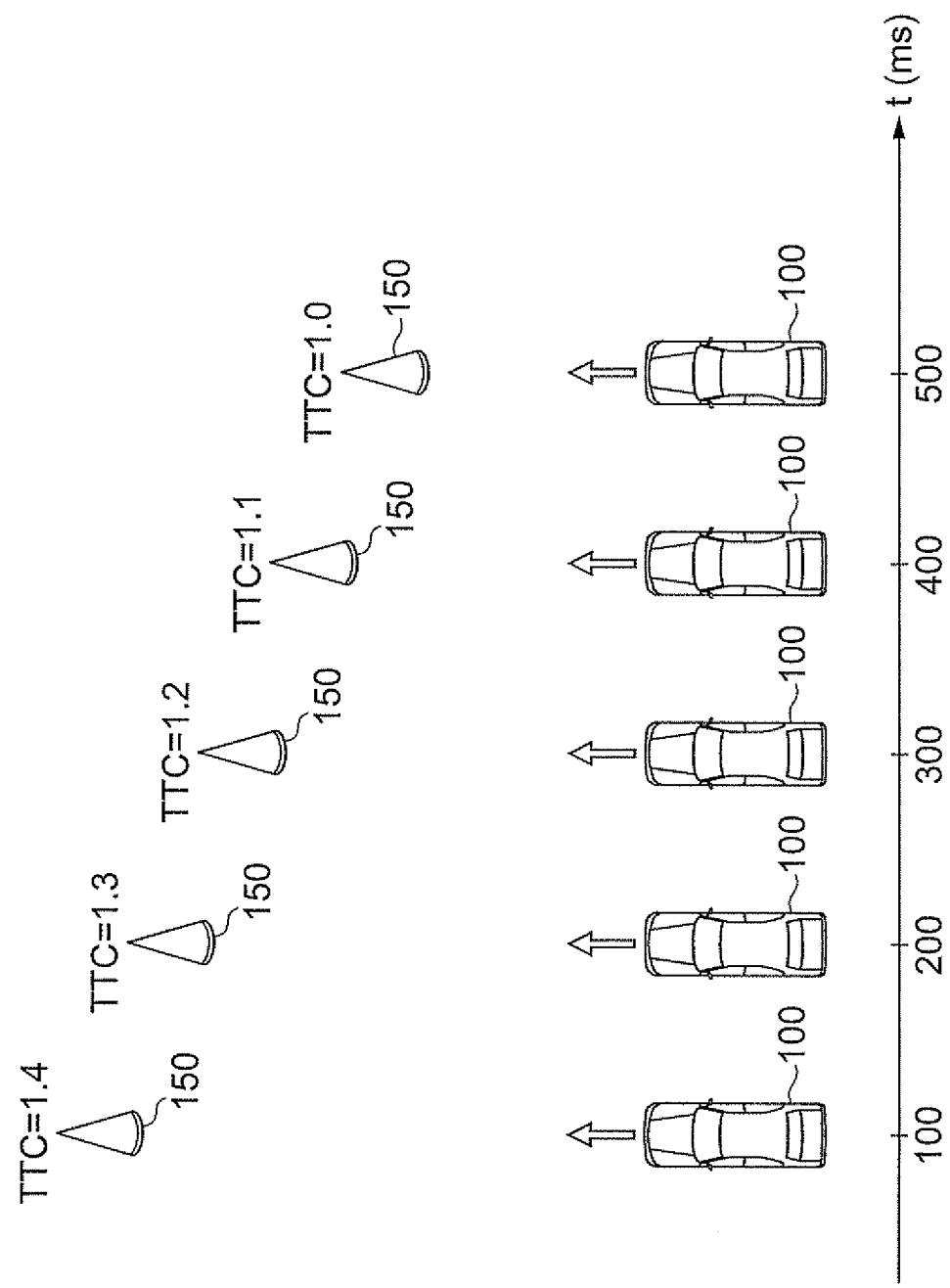
FIG. 4 is a diagram illustrating a case where the amount of change in TTC is normal.

While the above-mentioned step S3 determines the collision possibility by an instantaneous value of TTC, step S41 determines the collision possibility by the amount of change in TTC as illustrated in FIG. 3. For example, when the own vehicle 100 approaches a still obstacle 150 as illustrated in FIG. 4, the TTC gradually decreases frame by frame, assuming that the frame interval is 100 ms.

Figure 5:
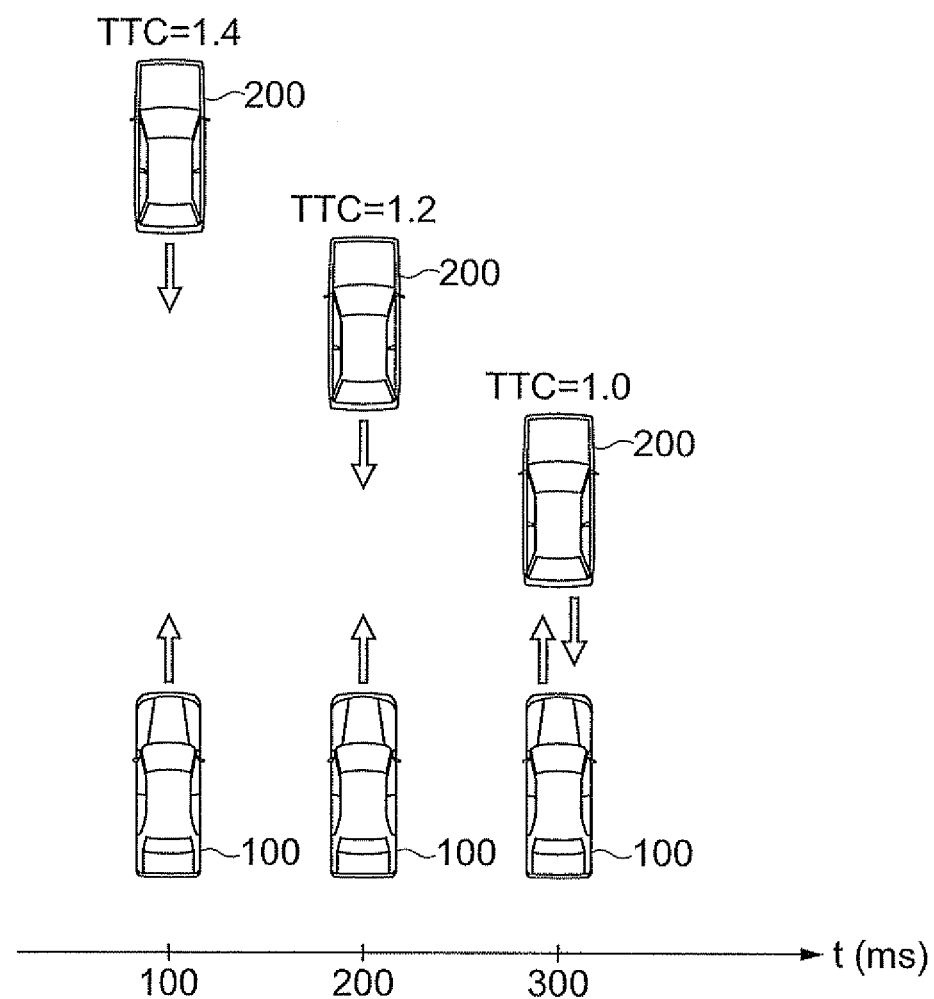
FIG. 5 is a diagram illustrating a case where the amount of change in TTC is large.
Figure 6:
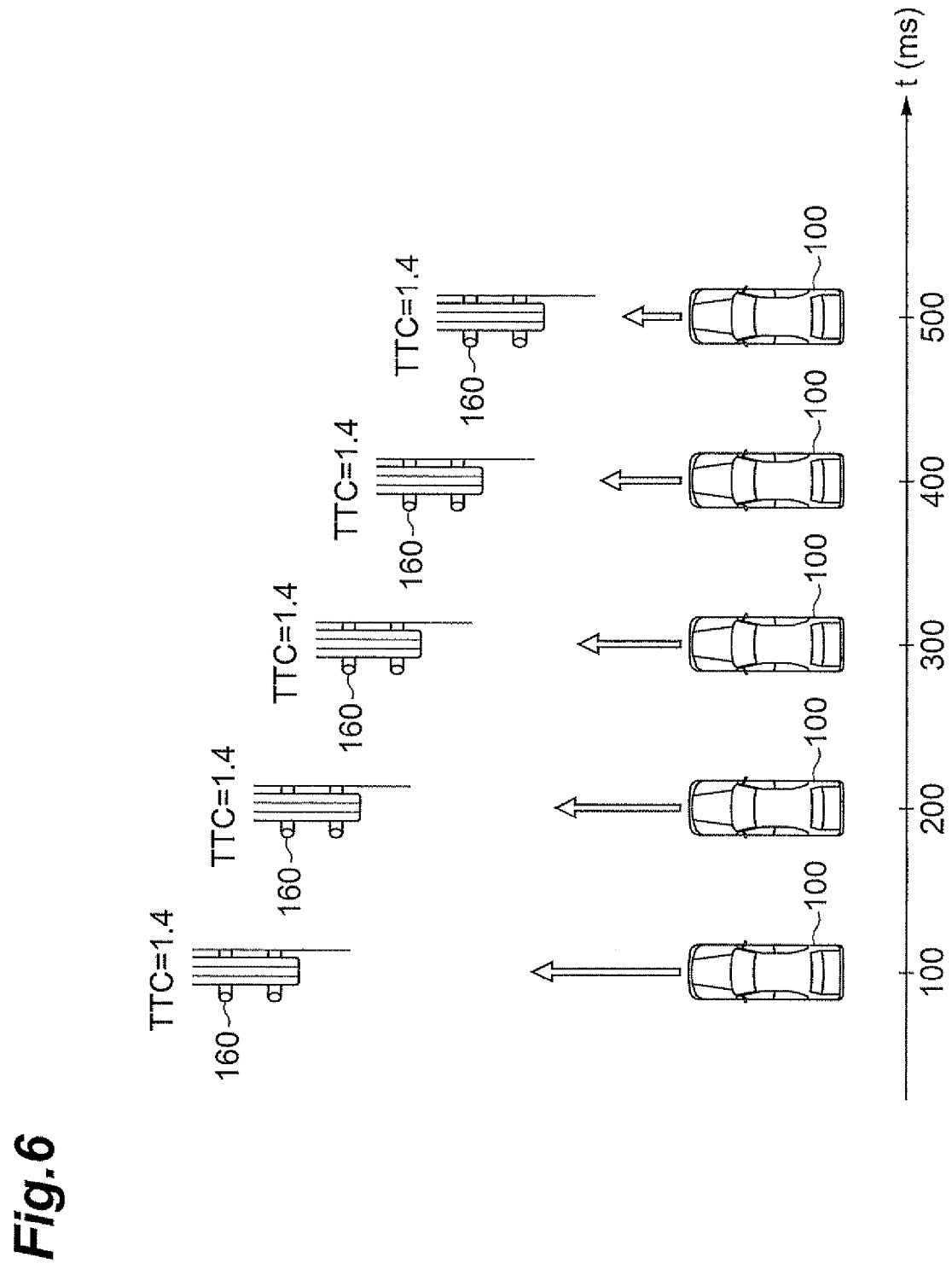
FIG. 6 is a diagram illustrating a case where the amount of change in TTC is 0.

When a preceding other vehicle 200 decelerates by sudden braking, the TTC rapidly decreases as illustrated in FIG. 5. Since one-frame determination with a short determination time is valid in such a case, the selecting section 56 operates the first actuating section 52, so as to actuate the vehicle control section 46 according to the one-frame determination, thereby performing the PCS control (S6). On the other hand, as illustrated in FIG. 6, the TTC does not change with respect to a road-side obstacle 160 such as a guardrail, since the driver allows the own vehicle to approach it while gradually decelerating. In such a case, the one-frame determination is invalid when judged from the amount of change in TTC, whereby the flow shifts to step S42.

Figure 7:
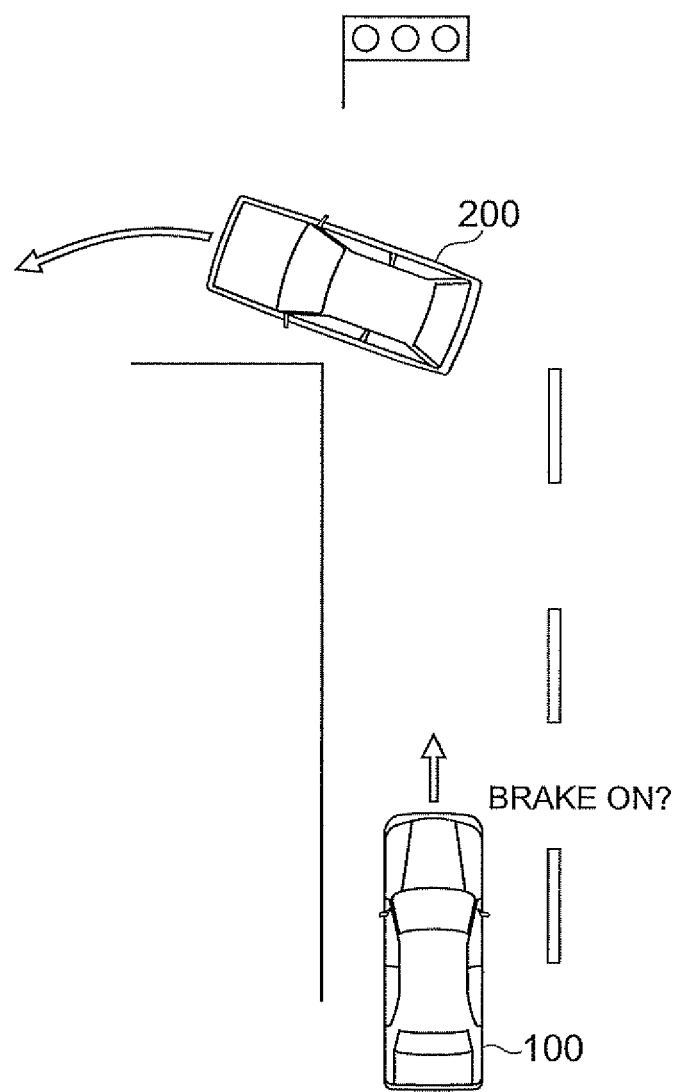
FIG. 7 is a diagram illustrating a countermeasure against malfunctions when a preceding vehicle turns left.
Figure 8:
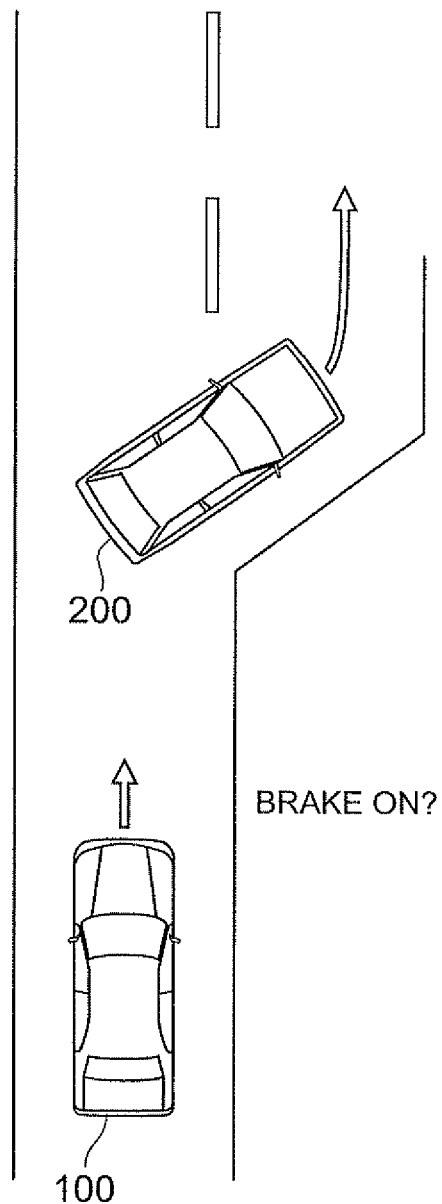
FIG. 8 is a diagram illustrating a countermeasure against malfunctions when the preceding vehicle changes lanes to the right.

At step S42, the validity of one-frame determination is judged according to object information such as right and left turns of an object and the own vehicle speed. When the brake ECU 24 is not in action or the vehicle speed sensor 16 does not detect deceleration of the own vehicle 100 in the case where the preceding other vehicle 200 turns left as illustrated in FIG. 7, there is a high risk, so that one-frame determination with a shorter determination time is valid, whereby the selecting section 56 operates the first actuating section 52, so as to actuate the vehicle control section 46 according to the one-frame determination, thereby performing the PCS control (S6). When the brake ECU 24 is in action or the vehicle speed sensor 16 detects deceleration of the own vehicle 100 in the case illustrated in FIG. 7, on the other hand, the driver pays sufficient attention, so that the one-frame determination is not valid for preventing malfunctions, whereby the flow shifts to step S43. The same holds when the preceding other vehicle 200 changes lanes to the right as illustrated in FIG. 8.

Figure 9:
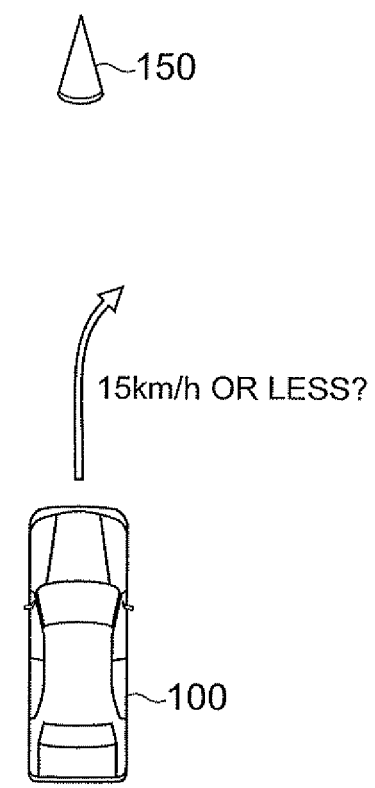
FIG. 9 is a diagram illustrating how the validity of one-frame determination is judged according to the own vehicle speed with respect to a still object.

When the vehicle speed detected by the vehicle speed sensor 16 exceeds a predetermined speed (third reference value), e.g., 15 km/h, in the case where the own vehicle 100 approaches the still obstacle 150 as illustrated in FIG. 9, one-frame determination with a shorter determination time is valid, whereby the selecting section 56 operates the first actuating section 52, so as to actuate the vehicle control section 46 according to the one-frame determination, thereby performing the PCS control (S6). When the vehicle speed of the own vehicle 100 detected by the vehicle speed sensor 16 is 15 km/h or less in the case illustrated in FIG. 9, on the other hand, the one-frame determination is not valid for preventing malfunctions, whereby the flow shifts to step S43.

Figure 10:
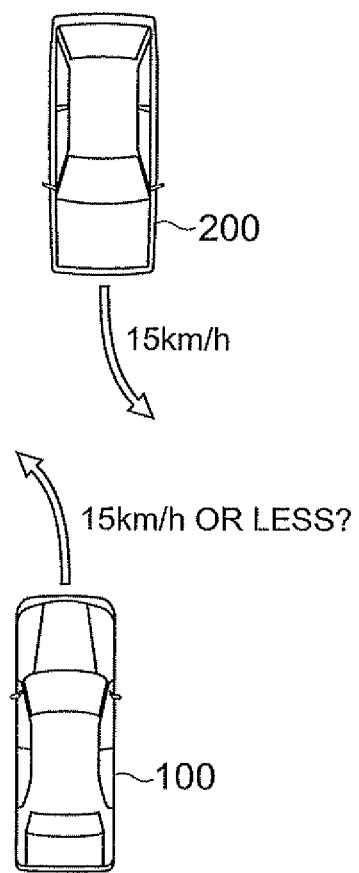
FIG. 10 is a diagram illustrating how the validity of one-frame determination is judged according to the own vehicle speed with respect to an oncoming vehicle.

When the own vehicle 100 approaches an oncoming other vehicle 200 as illustrated in FIG. 10, the relative speed between the other vehicle and own vehicle becomes greater. Even in this case, the driver is assumed to pay attention when the vehicle speed of the own vehicle 100 detected by the vehicle speed sensor 16 is 15 km/h or less, so that early determination is unnecessary, whereby one-frame determination is not supposed to be valid for preventing malfunctions, which makes the flow shift to step S43. When the vehicle speed of the own vehicle 100 detected by the vehicle speed sensor 16 exceeds 15 km/h, on the other hand, one-frame determination with a shorter determination time is valid, whereby the selecting section 56 operates the first actuating section 52, so as to actuate the vehicle control section 46 according to the one-frame determination, thereby performing the PCS control (S6).

At step S43, the validity of one-frame determination is judged according to the curvature of the running path of the own vehicle (fourth reference value). The curvature of the running path of the own vehicle can be detected by the steering angle sensor 18 and yaw rate sensor 20. When the running path of the own vehicle 100 is a straight path whose radius of curvature R is at infinity as illustrated in FIG. 11(a), the vehicle speed is supposed to be so high that the driver does not pay attention to the obstacle 150, whereby one-frame determination with a shorter determination time is valid, which makes the selecting section 56 operate the first actuating section 52, so as to actuate the vehicle control section 46 according to the one-frame determination, thereby performing the PCS control (S6).

When the running path of the own vehicle 100 is a curve of 600 R, for example, as illustrated in FIG. 11(b), on the other hand, the vehicle speed is supposed to be so low that the driver pays attention to the obstacle 150, which makes early determination unnecessary, so that one-frame determination is not valid for preventing malfunctions, whereby the flow shifts to step S44; when the one-frame determination is judged invalid in the subsequent step as well, the flow shifts to step S5, so as to perform M-frame determination. When the running path of the own vehicle 100 is a sharp curve of 60 R, for example, as illustrated in FIG. 11(c), the vehicle speed is slower, so that the driver pays attention to the obstacle 150, which makes it unfavorable to cause malfunctions with respect to road-side objects and the like incurring no collision possibility with the own vehicle 100, whereby determination is carried out by N frames where N is greater than M.

At step S44, the validity of one-frame determination is judged according to whether or not the detection accuracy of the radar 12 and image sensor 14 exceeds a predetermined reference value (fifth reference value). Suppose that, when objects are detected at times t1 to t5 as illustrated in FIG. 12(a), instantaneous reliabilities of detected values are determined according to detected radio field intensities, image edge clarities, and the like as in FIG. 12(b). In FIG. 12(b), the detection accuracy of an object plotted with a circle is unreliable at time $t_1$ but reliable at times $t_2$ to $t_5$. On the other hand, the detection accuracy of an object plotted with letter x is reliable at times $t_1$ to $t_3$ but unreliable at times $t_4$, $t_5$.

Suppose that the temporal reliability increases when the state where the detection accuracy is reliable continues and decreases when the state where the detection accuracy is unreliable continues. Suppose that the temporal reliability reaches a saturated value when the reliable state continues three times or more. The temporal reliability of the object plotted with a circle in FIG. 12(b) increases and exceeds a threshold, thereby reaching a saturated value as illustrated by a solid line in FIG. 12(c). In this case, there is a high possibility of an obstacle existing, so that one-frame determination with a short determination time is valid, whereby the selecting section 56 operates the first actuating section 52, so as to actuate the vehicle control section 46 according to the one-frame determination, thereby performing the PCS control (S6). On the other hand, the temporal reliability of the object plotted with letter x in FIG. 12(b) decreases below the threshold as illustrated by a broken line in FIG. 12(c). In this case, there is a low possibility of an obstacle existing, so that early determination is unnecessary, whereby one-frame determination is not valid for preventing malfunctions, which makes the flow shift to step S45; when the one-frame determination is judged invalid in the subsequent step as well, the flow shifts to step S5, so as to perform M-frame determination.

At step S45, the validity of one-frame determination is judged according to whether or not the alertness of the driver detected by the driver monitor sensor 22 is less than a predetermined reference value (sixth reference value). When the difference between the face orientation of the driver detected by the driver monitor sensor 22 and the direction of the object detected by the radar 12 and image sensor 14 exceeds a predetermined angle, for example, the alertness of the driver is supposed to be low, so that one-frame determination with a short determination time is valid, whereby the selecting section 56 operates the first actuating section 52, so as to actuate the vehicle control section 46 according to the one-frame determination, thereby performing the PCS control (S6). When the difference between the face orientation of the driver detected by the driver monitor sensor 22 and the direction of the object detected by the radar 12 and image sensor 14 is the predetermined angle or less, on the other hand, the alertness of the driver is supposed to be high, so that the one-frame determination is not valid for preventing malfunctions, whereby the flow shifts to step S5, so as to perform M-frame determination.

Since the collision predicting section 50 has the first actuating section 52 for causing the vehicle control section 46 to perform running control when the collision possibility exceeds a reference value in one-frame determination, the second actuating section 54 for causing the vehicle control section 46 to perform running control when the collision possibility exceeds a reference value in M-frame determination, and the selecting section 56 for selectively operating the first actuating section 52 and second actuating section 54, this embodiment can operate the vehicle control section 46 by two kinds of numbers of determinations, whereby the speed of collision determination can be secured by a smaller number of determinations when operating the first actuating section 52, while malfunctions can be reduced more by a greater number of determinations when operating the second actuating section 54.

In particular, the selecting section 56 can speed up the collision determination by operating the first actuating section 52 when the collision possibility exceeds a predetermined reference value and yields a high risk, and reduce malfunctions more by operating the second actuating section 54 when the collision possibility fails to exceed the predetermined reference value and yields a low risk. Hence, the collision reducing device in accordance with this embodiment temporally and spatially expands a range in which a collision mitigating operation can be carried out correctly in an early stage, thereby enhancing its potential working factor.

The selecting section 56 can speed up the collision determination by operating the first actuating section 52 when the own vehicle speed detected by the vehicle speed sensor 16 exceeds a predetermined reference value and yields a high risk, and reduce malfunctions more by operating the second actuating section 54 when the own vehicle speed detected by the vehicle speed sensor 16 fails to exceed a predetermined reference value and yields a low risk.

The selecting section 56 can speed up the collision determination by operating the first actuating section 52 at a risky time when the brake ECU 24 does not perform a braking operation, and reduce malfunctions more by operating the second actuating section 54 at a relatively safe time when the brake ECU 24 performs the braking operation.

The selecting section 56 can speed up the collision determination by operating the first actuating section 52 when the running path of the own vehicle 100 is a gentle curve or straight path with a curvature exceeding a predetermined reference value, since the vehicle speed is typically so high that the driver is not supposed to pay attention, and reduce malfunctions more by operating the second actuating section 54 when the running path of the own vehicle 100 is a sharp curve with a curvature not exceeding the predetermined reference value, since the vehicle speed is typically so low that the driver is supposed to pay attention.

The selecting section 56 can speed up the collision determination by operating the first actuating section 52 when the detection accuracy of the radar 12 and image sensor 14 exceeds a predetermined reference value so that the risk is reliably supposed to be high, and reduce malfunctions more by operating the second actuating section 54 when the detection accuracy of the radar 12 and image sensor 14 fails to exceed the predetermined reference value so that whether it is risky or not is unclear.

The selecting section 56 can speed up the collision determination by operating the first actuating section 52 when the alertness of the driver detected by the driver monitor sensor 22 is less than a predetermined reference value and yields a high risk, and reduce malfunctions more by operating the second actuating section 54 when the alertness of the driver detected by the driver monitor sensor 22 is the predetermined reference value or greater so that attention is paid.

Though an embodiment of the present invention is explained in the foregoing, the present invention can be modified in various ways without being restricted to the above-mentioned embodiment.

INDUSTRIAL APPLICABILITY

The present invention can operate collision influence reducing means by two kinds of numbers of determinations, whereby the speed of collision determination can be secured by a smaller number of determinations when operating the first actuating means, while malfunctions can be reduced more by a greater number of determinations when operating the second actuating means.

The invention claimed is:

1. A collision reducing device comprising:
    a sensor that is configured to detect information about objects around an own vehicle;
    a detector that is configured to detect an object existing in the information;
    a first actuating unit that is configured to determine whether a number of a collision possibility between the object and the own vehicle exceeds a first reference value by more than a first number of times in a first number of frames;
    a second actuating unit that is configured to determine whether a number of the collision possibility exceeds the first reference value by more than a second number of times in a second number of frames, the second number being greater than the first number;
    a selecting unit that is configured to select one of the first actuating unit and the second actuating unit in accordance with the collision possibility and a second reference value of a time to collision; and
    a controller that is configured to control the own vehicle to reduce collision influence based on selected actuating.

2. A collision reducing device according to claim 1, wherein the selecting unit operates the first actuating unit if the collision possibility exceeds the second reference value and operates the second actuating unit if the collision possibility does not exceed the second reference value.

3. A collision reducing device according to claim 1, further comprising a vehicle speed detecting unit for detecting an own vehicle speed;
    wherein the selecting unit operates the first actuating unit if the own vehicle speed detected by the vehicle speed detecting unit exceeds a third reference value and operates the second actuating unit if the own vehicle speed detected by the vehicle speed detecting unit does not exceed a third reference value.

4. A collision reducing device according to claim 1, further comprising braking unit for performing a braking operation of the own vehicle;
    wherein the selecting unit operates the first actuating unit if the braking unit does not perform the braking operation and operates the second actuating unit if the braking unit performs the braking operation.

5. A collision reducing device according to claim 1, wherein the selecting unit operates the first actuating unit if a curvature of a running path of the own vehicle exceeds a fourth reference value and operates the second actuating unit if a radius of curvature of a running path of the own vehicle does not exceed a fourth reference value.

6. A collision reducing device according to claim 1, wherein the selecting unit operates the first actuating unit if a detection accuracy of the object detecting unit exceeds a fifth reference value and operates the second actuating unit if a detection accuracy of the object detecting unit does not exceed a fifth reference value.

7. A collision reducing device according to claim 1, further comprising a driver monitor sensor for detecting an alertness of a driver;
    wherein the selecting unit operates the first actuating unit if the alertness of the driver detected by the driver monitor sensor is less than a sixth reference value and operates the second actuating unit if the alertness of the driver detected by the driver monitor sensor is not less than a sixth reference value.

8. A collision reducing device comprising:
    a sensor that detects an object existing about an own vehicle; and
    an ECU that is configured to:
        determine whether a number of a collision possibility between the object and the own vehicle exceeds a first reference value by more than a first number of times or more in a first number of frames,
        determine whether or not to reduce collision influence in accordance with the collision possibility determination based on a second reference value that is a second number of times or more in a second number of frames, the second number being greater than the first number, select one of a first actuating unit and a second actuating unit in accordance with a time to collision, and configured to reduce the collision influence based on selected actuating.

9. A collision reducing method comprising:
detecting information about an own vehicle;
detecting an object existing in the information;
controlling, by a first actuating unit, the own vehicle to reduce collision influence in accordance with whether a number of a collision possibility between the object and the own vehicle exceeds a first reference value by more than a first number of times in a first number of frames;
controlling, by a second actuating unit, the own vehicle to reduce collision influence in accordance with whether a number of the collision possibility exceeds the first reference value by more than a second number of times in a second number of frames, the second number being greater than the first number;
selecting one of the first actuating unit and the second actuating unit in accordance with the collision possibility and a second reference value of a time to collision; and
controlling the own vehicle to reduce collision influence based on selected actuating.

* * * * *